3,026,807
ELECTROMAGNETIC PUMPS
William George Hutchinson, Appleton, near Warrington, and Leslie Charles Cole, Culcheth, near Warrington, England, assignors to United Kingdom Atomic Energy Authority, London, England
Filed Jan. 9, 1958, Ser. No. 707,971
Claims priority, application Great Britain Jan. 10, 1957
1 Claim. (Cl. 103—1)

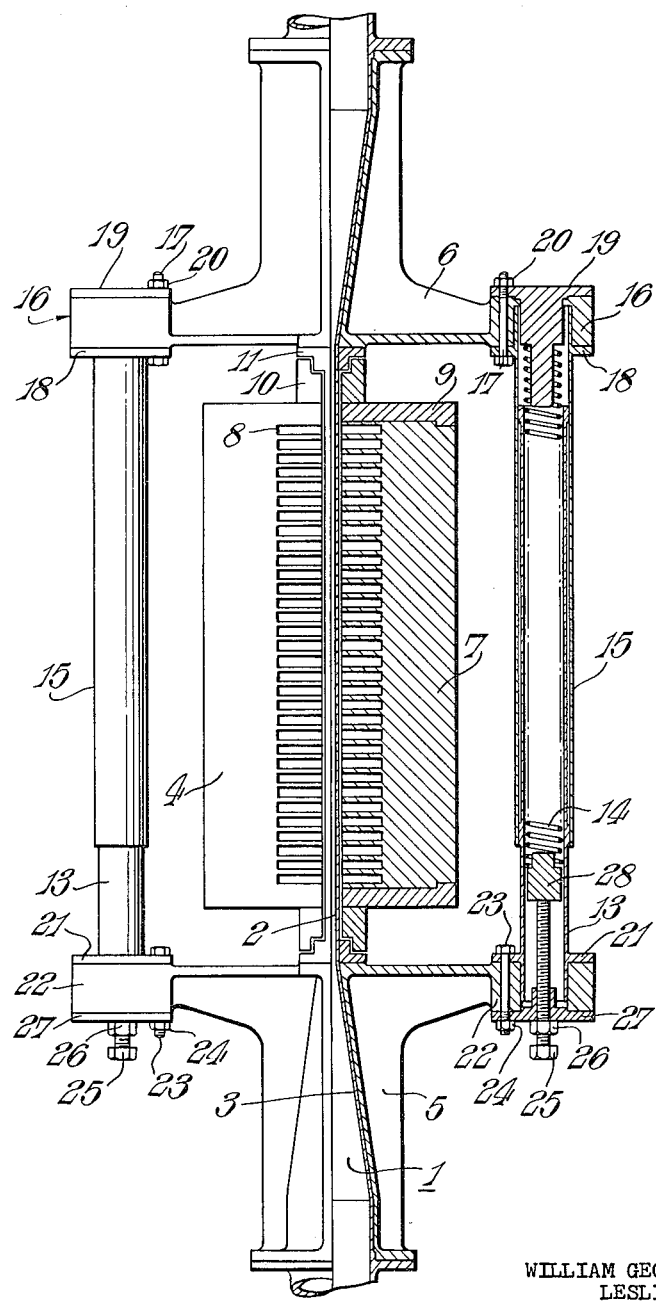

This invention relates to electro-magnetic pumps, that is, pumps in which electrically conductive fluid is moved in a channel in the pump by the interaction of an electric current and a magnetic flux passing through the fluid.

The pump channel of an electro-magnetic pump is made as thin as practicable to reduce the reluctance of the circuit traversed by the magnetic flux but a thin channel lacks mechanical strength to withstand, without buckling, compressive stresses arising in the course of temperature changes in the pump and associated pipework. It is an object of the present invention to provide an electro-magnetic pump having a thin pump channel equipped to avoid buckling of the channel.

According to the invention an electro-magnetic pump is characterised in that it has means for applying a tensile loading to the pump channel.

An embodiment of the invention will now be described with reference to the single FIGURE of the accompanying drawing which is a part-sectional plan view.

An electro-magnetic pump assembly has a pump channel 1 consisting of a flat portion 2 and two end diffuser parts 3. Stators 4 for providing a magnetic flux and an electric current mutually perpendicular to each other and transversing the channel 1 are disposed and adjacent the flat portions 2 and split castings 5 and 6 enclose the diffuser parts 3. The stators 4 comprise blocks 7 with slots 8 for windings (not shown for the sake of clarity) and end plates 9 to which are fixed guide pieces 10 locating the stators 4 relative to slides 11. Sleeves 13 housing springs 14 are slidable in outer sleeves 15 attached to flanges 16 on the split castings 6 by bolts 17 passing through flanges 18 on the sleeves 15. Plugs 19 supporting one end of the springs 14 are also secured to the flanges 16 by bolts 17 and nuts 20. The sleeves 13 have flanges 21 which are secured to flanges 22 in the split castings 5 by bolts 23 and nuts 24. Adjustable screws 25, locked by nuts 26, pass through end plates 27, also held against the flanges 22 by the bolts 23, and act on plugs 28 supporting the other end of the springs 14.

In setting-up the pump the position of the screw 25 is adjusted so that the flat portion 2 of the pump channel is held in tension to a calculated loading by compression of the springs 14. The pump may be used in any position where compressive stresses might be set up due to thermal or gravitational effects by suitably precompressing the springs so that for given operating conditions in the pump channel the net loading is always tensile.

We claim:
In an electromagnetic pump having a thin walled conduit for the passage of electrically conductive fluid, electrical means operatively associated with said conduit for providing a magnetic flux and an electrical current mutually perpendicular to each other and traversing the walls of the conduit, flanges connected to each end of said channel, and springs in compression between said flanges to apply a tensile loading to said conduit.

References Cited in the file of this patent
UNITED STATES PATENTS

| | | |
|---|---|---|
| 608,998 | Apthorp | Aug. 16, 1898 |
| 707,047 | Bitner | Aug. 12, 1902 |
| 922,556 | Batchelder | May 25, 1909 |
| 2,258,415 | Lago | Oct. 7, 1941 |
| 2,318,344 | Urschel | May 4, 1943 |
| 2,434,705 | Lago | Jan. 20, 1948 |
| 2,811,923 | Barnes | Nov. 5, 1957 |

FOREIGN PATENTS

| | | |
|---|---|---|
| 71,060 | Sweden | Jan. 29, 1930 |